US011146775B2

(12) United States Patent
Swope et al.

(10) Patent No.: US 11,146,775 B2
(45) Date of Patent: Oct. 12, 2021

(54) METHODS AND APPARATUS FOR DIMENSIONING AN OBJECT USING PROXIMATE DEVICES

(71) Applicant: SYMBOL TECHNOLOGIES, LLC, Lincolnshire, IL (US)

(72) Inventors: Charles Burton Swope, Coral Springs, FL (US); Nicole Daphne Tricoukes, Seaford, NY (US); Matthew Louis Kowalski, Merrick, NY (US); Michael J. Giannetta, Centerport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/986,136

(22) Filed: May 22, 2018

(65) Prior Publication Data
US 2019/0141312 A1    May 9, 2019

Related U.S. Application Data

(60) Provisional application No. 62/582,908, filed on Nov. 7, 2017.

(51) Int. Cl.
H04N 13/239    (2018.01)
H04N 13/332    (2018.01)
(Continued)

(52) U.S. Cl.
CPC .......... *H04N 13/239* (2018.05); *G01B 11/02* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 8,253,538 B1    8/2012 Chu et al.
2010/0008539 A1    1/2010 Johnson
(Continued)

FOREIGN PATENT DOCUMENTS

CA    2748882 C    2/2012
EP    2420854 A1    2/2012
WO    2013/167901 A1    11/2013

OTHER PUBLICATIONS

International Search Report and Written Opinion for International Application No. PCT/US2018/54158 dated Dec. 12, 2018.
(Continued)

*Primary Examiner* — Fernando Alcon
(74) *Attorney, Agent, or Firm* — Yuri Astvatsaturov

(57) ABSTRACT

Methods and apparatus for dimensioning an object by enlisting proximate devices to obtain image data representative of the object from multiple perspectives are provided. An example method includes capturing, by a first image capture device, first image data representative of an object from a first perspective; determining whether a second image capture device is within proximity of the first image capture device; and when the second image capture device is within proximity of the first image capture device, sending a request to the second image capture device for second image data representative of the object from a second perspective, wherein the first image data and the second image data are combinable to form a composite representative of the object.

20 Claims, 7 Drawing Sheets

(51) Int. Cl.
*H04W 4/02* (2018.01)
*G06K 9/00* (2006.01)
*G01B 11/02* (2006.01)
*G06T 7/593* (2017.01)
*G06T 7/62* (2017.01)
*H04N 5/247* (2006.01)
*H04N 13/243* (2018.01)
*H04N 13/00* (2018.01)
*G06T 15/08* (2011.01)
*G06F 3/01* (2006.01)
*G02B 27/01* (2006.01)
*H04W 4/80* (2018.01)

(52) U.S. Cl.
CPC .......... *G06K 9/00671* (2013.01); *G06T 7/593* (2017.01); *G06T 7/62* (2017.01); *G06T 15/08* (2013.01); *H04N 5/247* (2013.01); *H04N 13/332* (2018.05); *H04W 4/023* (2013.01); *G02B 2027/014* (2013.01); *G02B 2027/0138* (2013.01); *G02B 2027/0178* (2013.01); *G06T 2207/10012* (2013.01); *G06T 2219/012* (2013.01); *H04N 13/243* (2018.05); *H04N 2013/0081* (2013.01); *H04W 4/027* (2013.01); *H04W 4/80* (2018.02)

(56) References Cited

U.S. PATENT DOCUMENTS

| | | | |
|---|---|---|---|
| 2012/0190403 A1 | 7/2012 | Myers et al. | |
| 2014/0160157 A1 | 6/2014 | Poulos et al. | |
| 2015/0374028 A1 | 12/2015 | Gindrat | |
| 2017/0094259 A1* | 3/2017 | Kouperman | H04N 13/243 |
| 2018/0115700 A1* | 4/2018 | Ryan | H04N 13/204 |
| 2018/0220125 A1* | 8/2018 | Tamir | G06T 19/003 |
| 2018/0357907 A1* | 12/2018 | Reiley | G08G 1/202 |
| 2019/0053012 A1* | 2/2019 | Hill | G01S 5/02 |
| 2019/0312985 A1* | 10/2019 | Yeap | G06K 9/3208 |
| 2019/0379749 A1* | 12/2019 | Ovesny | G06F 16/00 |

OTHER PUBLICATIONS

Novelty Search Report for Belgian Patent Application No. 2018/5781 dated Aug. 2, 2019.

Brian Yuntian et al.: "Overview of RFID—Based Indoor Positioning Technology", Dec. 2012 (Dec. 7, 2012), retrieved from the Internet: URL: https://pdfs.semanticscholar.org/bc61/b9527b2901dcfa4683483373c24ee5a2a642.pdf.

* cited by examiner

METHODS AND APPARATUS FOR DIMENSIONING AN OBJECT USING PROXIMATE DEVICES

CROSS-REFERENCE TO RELATED APPLICATIONS

This application claims the priority benefit under 35 U.S.C. § 119(e) of U.S. Provisional Application No. 62/582,908, titled "Methods and Apparatus for Dimensioning an Object Using Proximate Devices," filed Nov. 7, 2017, the disclosure of which is incorporated herein by reference in its entirety.

BACKGROUND

In an inventory environment, such as a retail store, a warehouse, a shipping facility, etc., it is useful to know the dimensions of an object, such as a box.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts disclosed herein, and explain various principles and advantages of those embodiments.

DETAILED DESCRIPTION

Systems and methods are provided for dimensioning an object by enlisting proximate image capture devices to obtain image data representative of the object from multiple perspectives. While image data from a single image capture device from a single perspective may be sufficient to determine one or more dimensions of an object, dimensioning operations (e.g., calculations) are enhanced by an availability of additional image data from, for example, different perspectives. That is, information indicative of different sides of the object is useful when determining, for example, dimensions of an object appearing in image data. Examples disclosed herein detect that one or more secondary image capture devices are in proximity (e.g., within a threshold distance) with a primary image capture device. In response to such detection(s), examples disclosed herein request that the proximate image capture devices obtain timestamped image data of the object such that the corresponding additional information can be used to, for example, generate a composite representation of the object that is more granular than the representation from a single perspective. The additional information contained in the representation improves the accuracy and speed of dimensioning operations.

Figure 1:
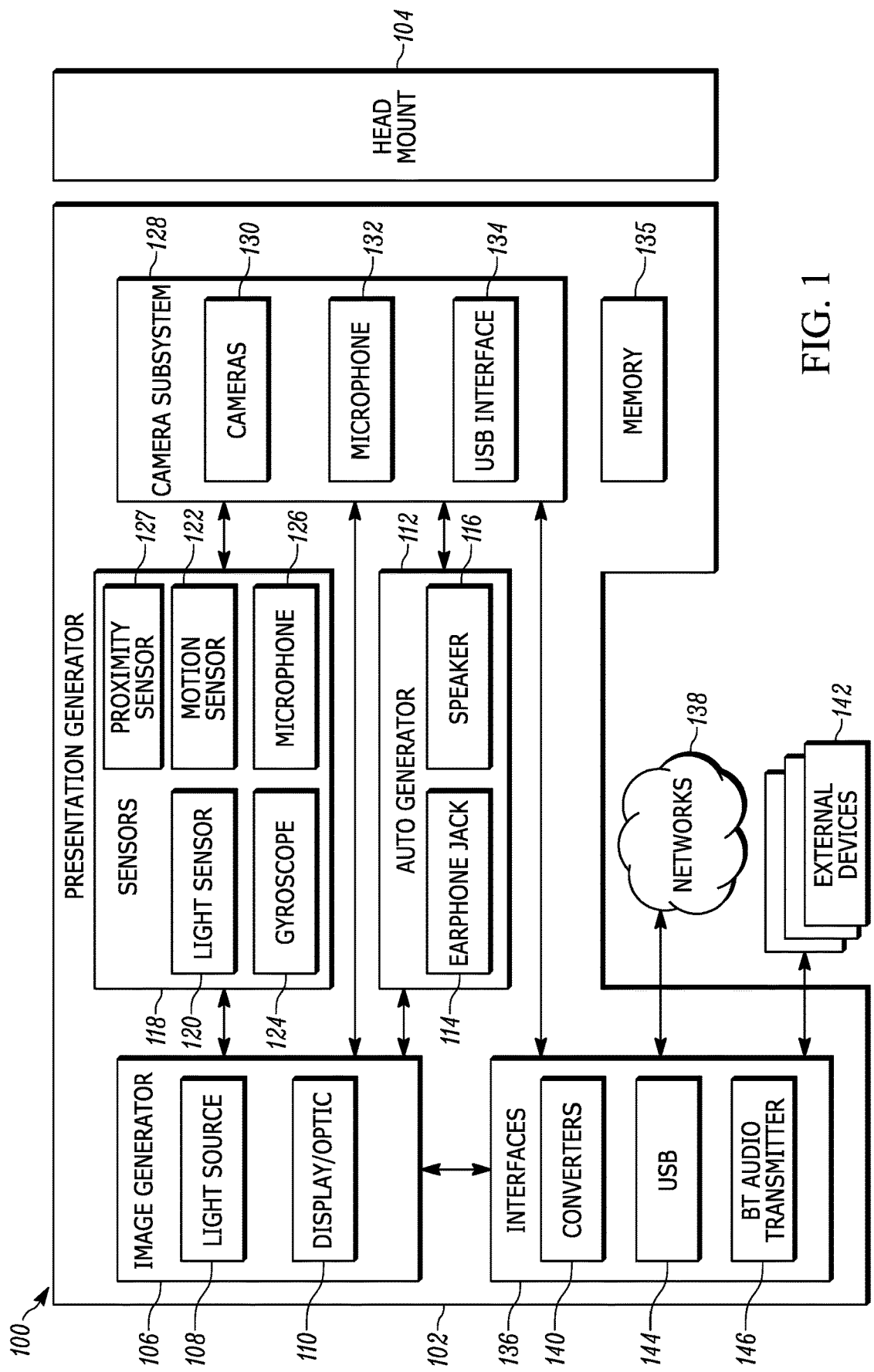
FIG. 1 is a block diagram of an example HUD assembly constructed in accordance with teachings of this disclosure.

FIG. 1 is a block diagram of an example HUD assembly 100 constructed in accordance with teachings of this disclosure. Alternative implementations of the example HUD assembly 100 of FIG. 1 include one or more additional or alternative elements, processes and/or devices. In some examples, one or more of the elements, processes and/or devices of the example HUD assembly 100 of FIG. 1 may be combined, divided, re-arranged or omitted. While examples disclosed herein are described in connection with a HUD assembly as a primary image capture device, examples disclosed herein can be utilized in additional or alternative devices, such as handheld mobile computers outfitted with a display and cameras (e.g., stereoscopic cameras and/or depth sensors) capable of obtaining image data and dimensioning an object. As used herein, image data refers to any suitable type of data that can be used to dimension the object. For instance, in some examples, the captured image data is a two-dimensional image, such as a picture and/or a pair of pictures captured by stereoscopic cameras. In some examples, the captured image data is a depth value at a coordinate. In some examples, the captured image data is a combination of an RGB value at a coordinate and a depth value at the coordinate, which is sometimes referred to as a voxel.

The example HUD assembly 100 of FIG. 1 includes a presentation generator 102 and a head mount 104. The head mount 104 is constructed to mount the presentation generator 102 to a head of a person such that a presentation generated by the presentation generator 102 is consumable by the person. The presentation includes visual media components (e.g., images) and/or audio media components. To generate images such as static or animated text and/or graphics, the example presentation generator 102 of FIG. 1 includes an image generator 106. The example image generator 106 of FIG. 1 is in communication with one or more sources of image data. The image data received at the image generator 106 is representative of, for example, text, graphics and/or augmented reality elements (e.g., information overlaid on objects within the field of view).

In the illustrated example, the presentation generator 106 is configured to display one or more messages or indicators associated with, for example, requests to proximate image capture devices sent by the HUD assembly 100, where the requests are for the proximate image capture devices to obtain timestamped image data representative of an object being held by a user of the HUD assembly 100. Additionally or alternatively, the presentation generator 106 may be configured to display one or more messages or indicators that one or more proximate image capture devices have accepted the request and/or have captured the requested image data.

The example image generator 106 of FIG. 1 utilizes a light source 108 and a display/optic 110 to present visual components of the presentation. In some examples, the example image generator 106 includes light engines that utilize the light source 108 (e.g., light emitting diodes (LEDs)) to generate light based on the received data. In some examples, the light engines receive processed data in condition for immediate conversion into light. In other examples, the light engines process raw image data before converting the image data into light. For example, to perform such processing, the light engines include and/or are in communication with one or more logic circuits configured to process the image data.

The light engines convert the received image data into patterns and pulses of light, and communicate the generated light to the display/optic 110, such that the images corresponding to the received data are displayed to the user via the display/optic 110. In some examples, the light engines include optics that condition or manipulate (e.g., polarize and/or collimate) the generated light prior to providing the light to the display/optic 110.

In some examples, the display/optic 110 includes a waveguide that carries the light received from the light engines in a direction and pattern corresponding to the image data. In some examples, the waveguide includes a plurality of internal surfaces that form a light guide to internally reflect the light as the light travels from an input to an output. For instance, the waveguide includes gratings at the output to diffract the light towards an eye of the user, thereby displaying the image to the user. Furthermore, in some examples, the waveguide includes first and second lenses arranged to be placed over first and second eyes, respectively, of the user. However, any suitable shape or size is possible for such a waveguide. In some examples, the waveguide is transparent such that the user can view surroundings simultaneously with the displayed image, or the surroundings only when no image is displayed on the waveguide.

While the example image generator 106 utilizes the light source 108 and the display/optic 110 to present visual components of the presentation, the example HUD assembly 100 of FIG. 1 can employ any suitable image generating technology such as, for example, cathode ray tube (CRT) devices or scanning lasers.

The example presentation generator 102 of FIG. 1 includes an audio generator 112 that receives audio data and converts the audio data into sound via an earphone jack 114 and/or a speaker 116. For example, the audio generator 112 may generate a sound to indicate that a proximate image capture device has accepted a request to obtain image data of an object and/or that the proximate image capture device has obtained the requested image data. In some examples, the audio generator 112 and the image generator 106 cooperate to generate an audiovisual presentation.

In the example of FIG. 1, the example presentation generator 102 includes (e.g., houses) a plurality of sensors 118. In the example of FIG. 1, the plurality of sensors 118 include a light sensor 120, a motion sensor 122 (e.g., an accelerometer), a gyroscope 124, a microphone 126, and a proximity sensor 127. In some examples, the presentation generated by the example image generator 106 and/or the audio generator 112 is affected by one or more measurements and/or detections generated by one or more of the sensors 118. For example, a characteristic (e.g., degree of opacity) of the display generated by the image generator 106 may depend on an intensity of ambient light detected by the light sensor 120. Additionally or alternatively, one or more modes, operating parameters, or settings are determined by measurements and/or detections generated by one or more of the sensors 118. For example, the presentation generator 102 may enter a standby mode if the motion sensor 122 has not detected motion in a threshold amount of time.

In the illustrated example, the proximity sensor 127 is configured to provide location and/or movement information associated with the HUD assembly 100 to, for example, a server and/or other image capture devices located within a range of the HUD assembly 100. In some examples, the proximity sensor 127 coordinates with other proximity sensors carried by the other image capture devices to determine whether one or more of the image capture devices are within a threshold distance of each other (i.e., are proximate with each other). For example, the proximity sensor 127 may attempt to pair (e.g., via a Bluetooth® communication device) with surrounding devices that are also outfitted with similar (e.g., operating according to the same communication protocol) sensors. In some examples, the HUD assembly 100 and other image capture devices are locatable using an RFID-based locating system via the proximity sensor 127 and other similar sensors carried by the other image capture devices. For example, the proximity sensor 127 may be configured to transmit radio frequency (RF) blinks that are read by fixed RFID readers capable of locating the HUD assembly 100 based on the blinks (e.g., via triangulation techniques). In some examples, the proximity sensor 127 is a satellite based sensor capable of providing locating information based on, for example, a GPS system that is also aware of the locations of the other image capture devices. In such instances, the locations of the different image capture devices can be compared to determine whether any of the image capture devices are proximate with each other. In some examples, the proximity sensor 127 provides movement and/or positional information associated with the HUD assembly 100 such as, for example, pitch, roll, yaw, altitude, and heading information. In some examples, the proximity sensor 127 defines a local geometry or coordinate system and the corresponding location on the coordinate system associated with the HUD assembly 100. For example, when the HUD assembly 100 is initialized (e.g., powered on), the proximity sensor 127 can log the starting location of the HUD assembly as 0, 0, 0 in the coordinate system. In such instances, the proximity sensor 127 updates the location of the HUD assembly 100 as the user moves. Further, in such instances, other image capture devices have locations in the coordinate system (e.g., fixed locations for static image capture device and updated locations for mobile image capture devices such as other HUD assemblies or handheld mobile computing devices). As such, the image capture devices within a threshold distance according to the coordinate system are considered proximate devices. In some examples, the proximity sensor 127 utilizes strength of signal (e.g., of WiFi signals) systems to locate the HUD assembly 100 and/or other image capture devices relative to each other and/or a coordinate system.

As described in detail herein, data provided by the proximity sensor 127 is used to enlist proximate image capture device in obtaining additional image data representative of an object being dimensioning by the HUD assembly 100 (i.e., the primary image capture device).

The example presentation generator 102 of FIG. 1 includes a camera sub-system 128. In some examples, the camera sub-system 128 is mounted to or carried by the same housing as the presentation generator 102. In some examples, the camera sub-system 128 is mounted to or carried by the head mount 104. The example camera sub-system 128 includes two cameras 130 and a microphone 132 to capture image data and audio data, respectively, representative of an environment surrounding the HUD assembly 100. In some examples, the camera sub-system 128 includes one or more depth sensors to detect distances between objects in a field of view and the HUD assembly 100. In some examples, image and/or audio data captured by the cameras 130 and/or microphone 132 is integrated with the presentation generated by the image generator 106 and/or the audio generator 112. For example, the camera sub-system 128 of FIG. 1 communicates data to the image generator 102, which may process the image data to generate one or more corresponding images on the display/optic 110. In some examples, the image data and/or audio data captured by the cameras 130 and/or the microphone 132, respectively, is stored in memory 135 of the example HUD assembly 100. In some examples, the image data and/or audio data captured by the cameras 130 and/or the microphone 132, respectively, is communicated via, for example, a USB interface 134 of the camera sub-system 128 to a device (e.g., a server or external memory) external to the HUD assembly 100.

The example presentation generator 102 of FIG. 1 includes a plurality of interfaces 136 configured to enable the HUD assembly 100 to communicate with one or more external devices 136 and one or more networks 138. In the example of FIG. 1, the interfaces 136 include converters 140 (e.g., an HDMI to LVDS-RGB converter) to convert data from one format to another, a USB interface 144, and a Bluetooth® audio transmitter 146. In some examples, the example Bluetooth® audio transmitter 146 cooperates with one or both of the microphones 126, 132 of the HUD assembly 100 to receive voice input from the user and to convey the voice input to one or more of the external devices 136. For example, voice input may be provided to a mobile computing device being worn by the user via the HUD assembly 100 using the Bluetooth® audio transmitter 146. Examples external devices 136 include keypads, Bluetooth® click buttons, smart watches, and mobile computing devices.

The example image generator 106, the example light source 108, the example audio generator 112, the example camera-sub-system 128, the example converters 140, the example USB interfaces 134, 144 and/or, more generally, the example presentation generator 102 of FIG. 1 are implemented by hardware, software, firmware, and/or any combination of hardware, software and/or firmware. In some examples, at least one of the example image generator 106, the example light source 108, the example audio generator 112, the example camera-sub-system 128, the example converters 140, the example USB interfaces 134, 144 and/or, more generally, the example presentation generator 102 of FIG. 1 is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations. Some example logic circuits are hardware that executes machine-readable instructions to perform operations. Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Figure 2A:
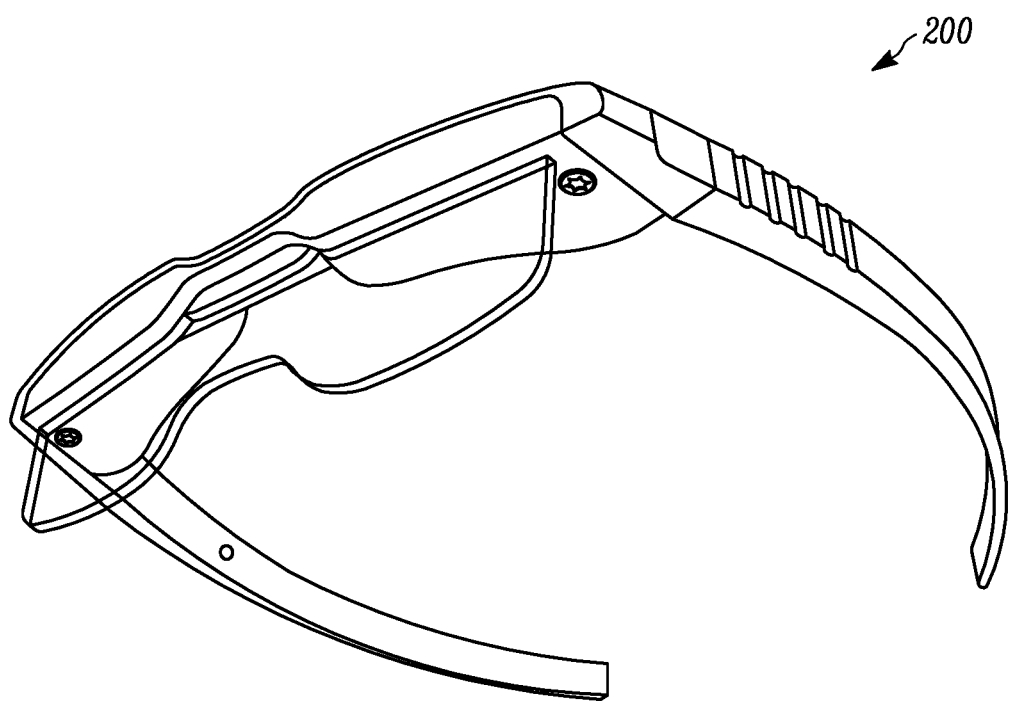
FIGS. 2A and 2B illustrate an example HUD assembly that may implement the example HUD assembly of FIG. 1.
Figure 2B:
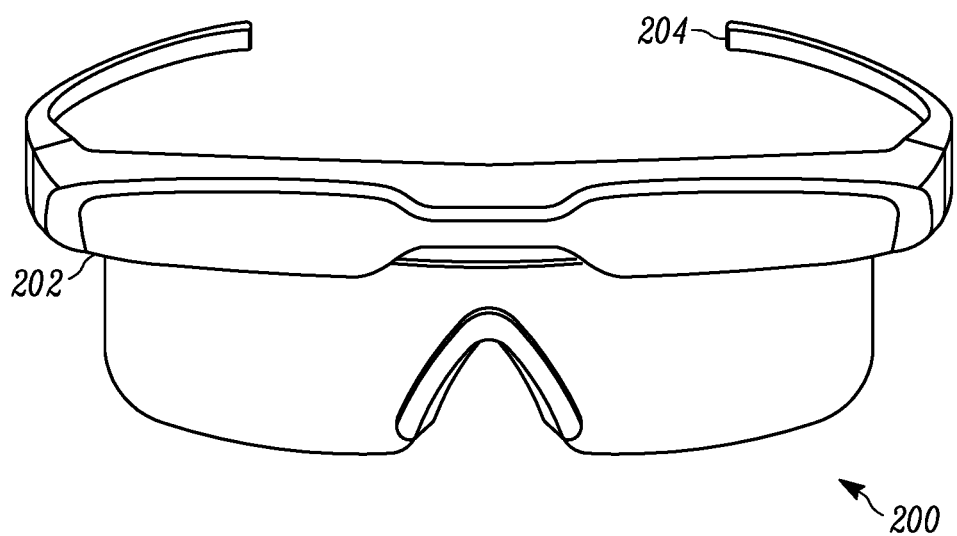

FIGS. 2A and 2B illustrate an example HUD assembly 200 that may implement the example HUD assembly 100 of FIG. 1. The example HUD assembly 200 of FIG. 2B includes a presentation generator 202 and an example head mount 204. The example presentation generator 202 of FIG. 2B houses or carries components configured to generate, for example, an audiovisual presentation for consumption by a user wearing the example HUD assembly 200 of FIG. 2B. For example, the presentation generator 202 of FIG. 2B houses or carries the components of the example presentation generator 102 of FIG. 1.

Figure 3:
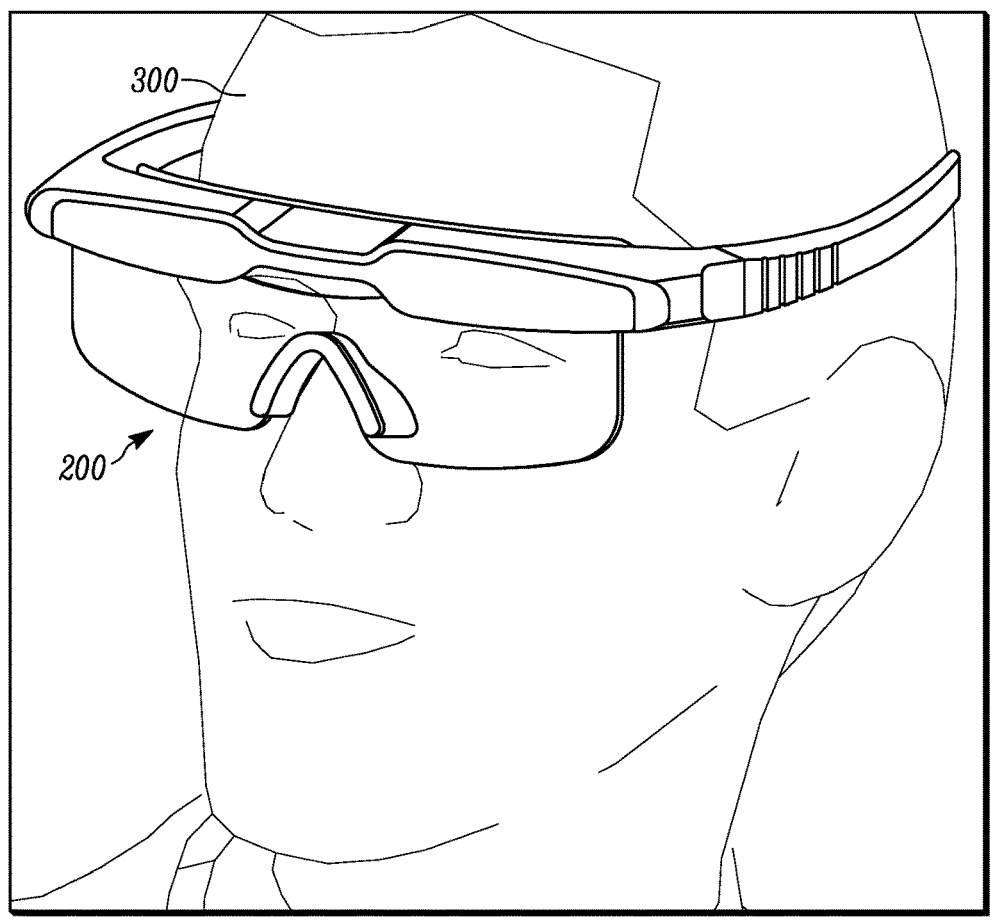
FIG. 3 illustrates the example HUD assembly of FIGS. 2A and 2B mounted to a head of a user.

FIG. 3 illustrates the example HUD assembly 200 of FIGS. 2A and 2B mounted to a head 300 of a user.

Figure 4:
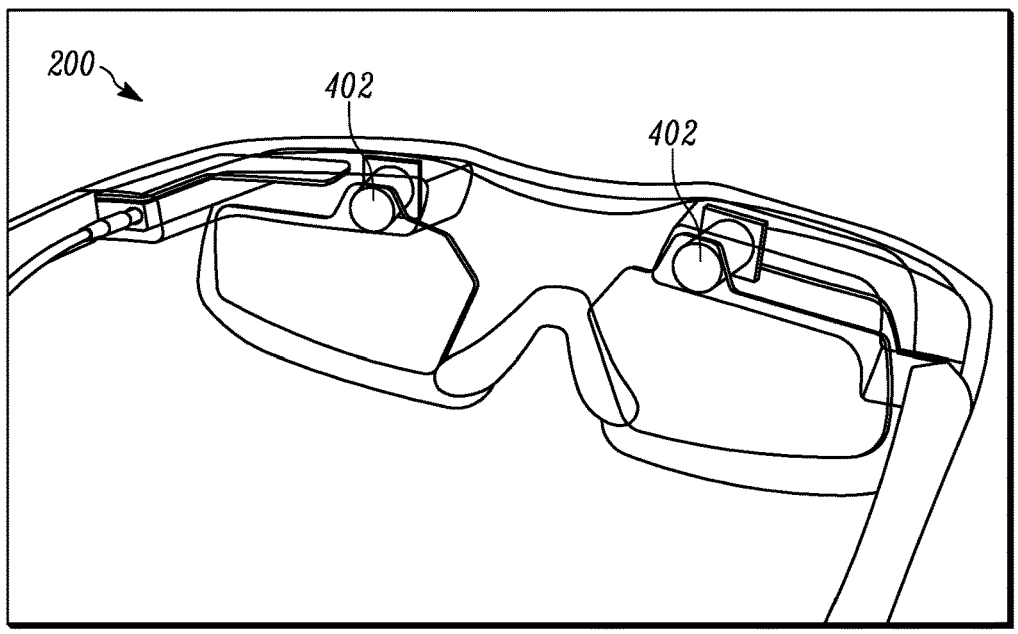
FIG. 4 illustrates example cameras mounted to an example HUD assembly.
Figure 5A:
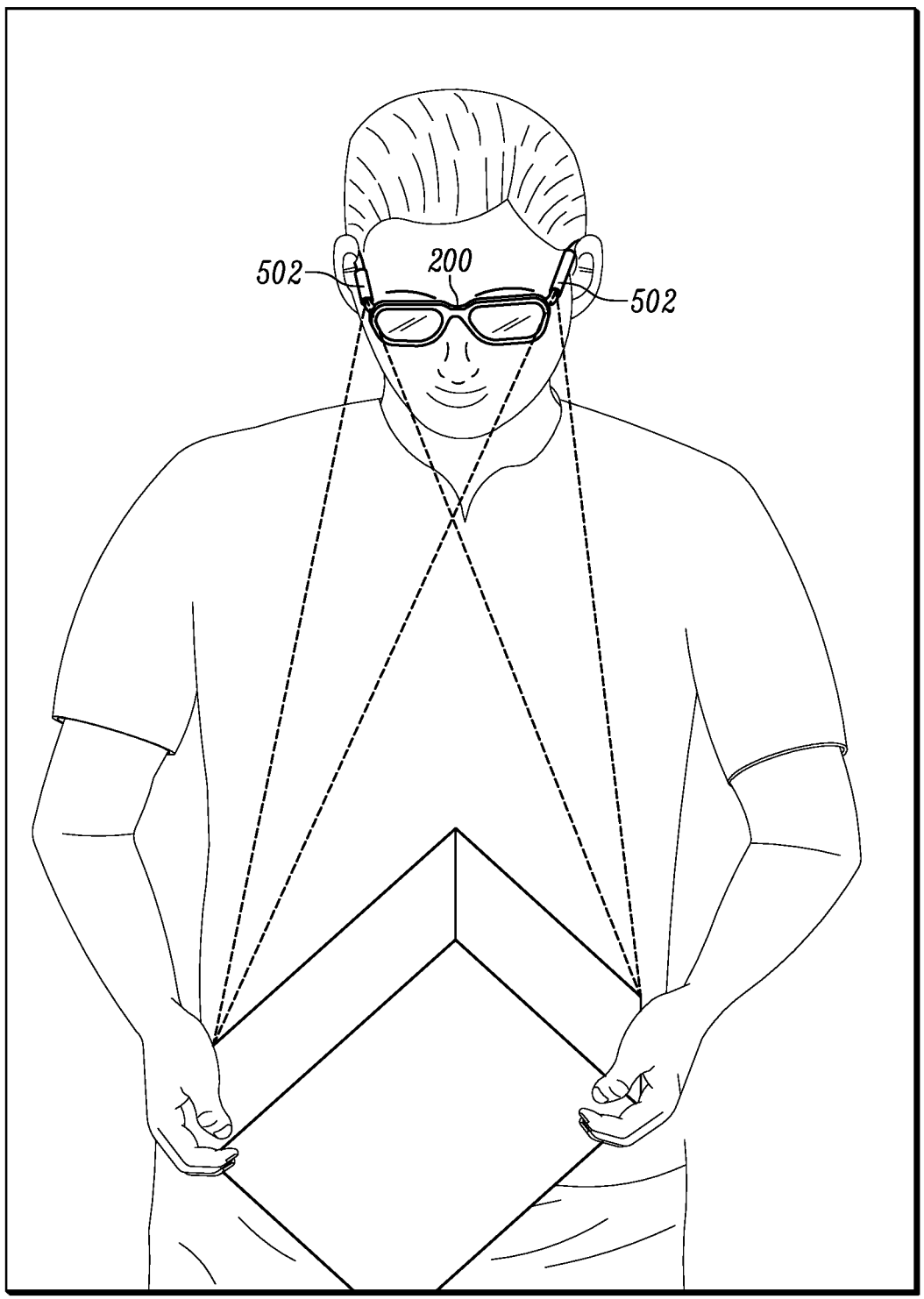
FIG. 5A illustrates a user wearing an example HUD assembly having cameras mounted thereto with a user looking at an example box object to be dimensioned.

FIG. 4 illustrates example cameras 402 that implement, for example, the cameras 130 of FIG. 1. As described above, the cameras 402 may be configured to capture image data representative of a box object and the hands of a user when a user wearing the HUD assembly 200 looks at a box object. While the example cameras 402 of FIG. 4 are positioned above each eyepiece, the cameras may be positioned in any suitable location such as, for example, at the edge of the frames. For example, FIG. 5A illustrates a user wearing the HUD assembly 200 and looking at a box object, with example cameras 502 mounted at the sides of the head mount, capturing image data including the box object and the hands of the user.

Figure 5B:
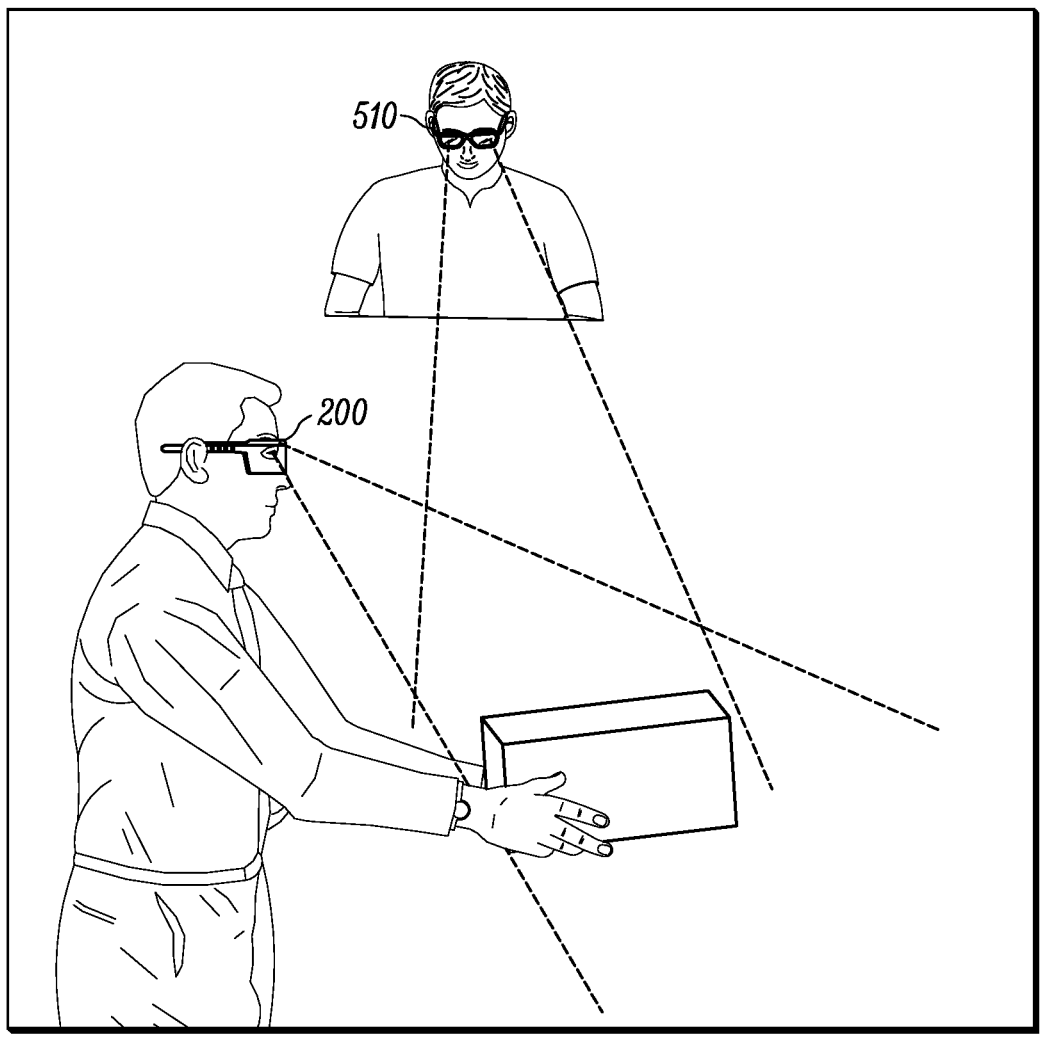
FIG. 5B illustrates multiple users wearing example HUD assemblies having cameras mounted thereto, with each user looking at an example box object to be dimensioned.

FIG. 5B illustrates multiple users wearing example HUD assemblies having cameras mounted thereto, with each user looking at an example box object to be dimensioned. As shown in FIG. 5B, a first user wearing example HUD assembly 200 holds the box object, while a second user wearing example HUD assembly 510 looks at the same box object. When the users face towards the same box object, the cameras (not shown) mounted to their respective HUD assemblies 200, 510 are each positioned to capture image data of the box object, from multiple perspectives.

Figure 5C:
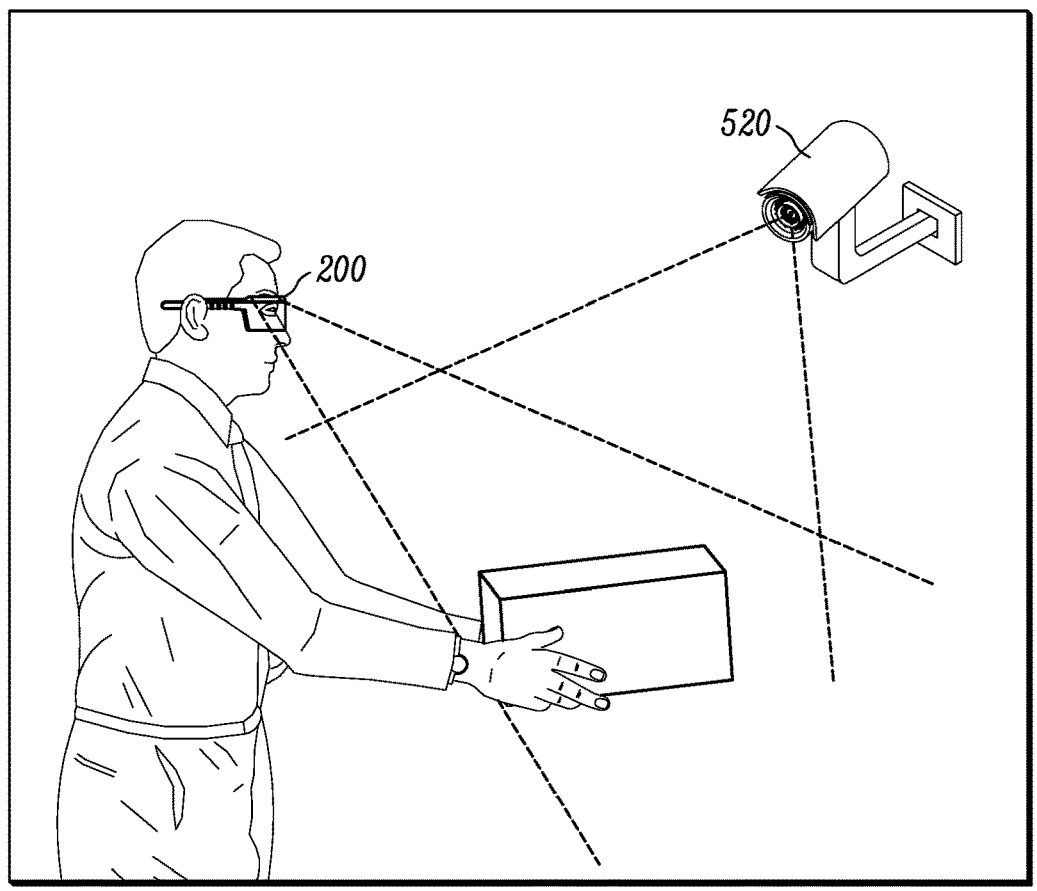
FIG. 5C illustrates an example box object to be dimensioned within the field of view of an example mounted camera, and a user wearing an example HUD assembly having cameras mounted thereto, with the user looking at the example box object to be dimensioned.

FIG. 5C illustrates an example box object to be dimensioned within the field of view of an example mounted camera, and a user wearing an example HUD assembly having cameras mounted thereto, with the user looking at the example box object to be dimensioned. As shown in FIG. 5C, a user wearing example HUD assembly 200 holds the box object, while a camera 520 (e.g., a mounted overhead camera) is directed towards the same box object. Accordingly, the cameras (not shown) of the HUD assembly 200 and the mounted camera 520 are each positioned to capture image data of the box object, from multiple perspectives.

Figure 6:
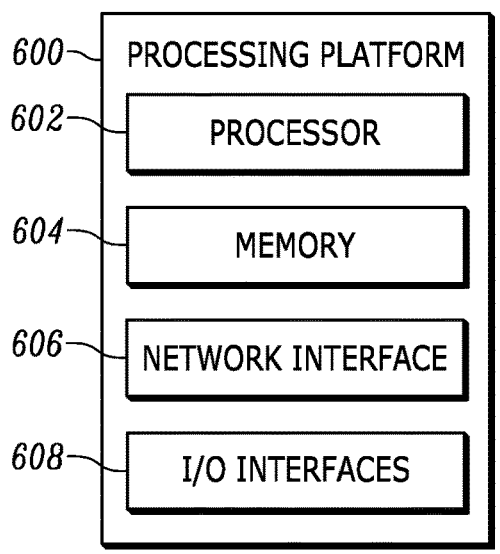
FIG. 6 is a block diagram representative of an example logic circuit configured in accordance with teachings of this disclosure.

FIG. 6 is a block diagram representative of an example logic circuit that may be utilized to implement, for example, the example image generator 106, the example light source 108, one or more of the example interfaces 136 and/or the example audio generator 112 of FIG. 1. The example logic circuit of FIG. 6 is a processing platform 600 capable of executing machine-readable instructions to, for example, implements operations associated with the example HUD assembly 100 of FIG. 1.

The example processing platform 600 of FIG. 6 includes a processor 602 such as, for example, one or more microprocessors, controllers, and/or any suitable type of processor. The example processing platform 600 of FIG. 600 includes memory (e.g., volatile memory, non-volatile memory) accessible by the processor 602 (e.g., via a memory controller). The example processor 602 interacts with the memory 604 to obtain, for example, machine-readable instructions stored in the memory 604. Additionally or alternatively, machine-readable instructions may be stored on one or more removable media (e.g., a compact disc, a digital versatile disc, removable flash memory, etc.) that may be coupled to the processing platform 600 to provide access to the machine-readable instructions stored thereon. In particular, the machine-readable instructions stored on the memory 604 may include instructions for carrying out any of the methods described in greater detail below at FIG. 7.

The example processing platform 600 of FIG. 6 further includes a network interface 606 to enable communication with other machines via, for example, one or more networks. The example network interface 606 includes any suitable type of communication interface(s) (e.g., wired and/or wireless interfaces) configured to operate in accordance with any suitable protocol(s). The example processing platform 600 of FIG. 6 includes input/output (I/O) interfaces 608 to enable receipt of user input and communication of output data to the user.

The example processing platform 600 of FIG. 6 may be configured to execute dimensioning operations using the image data captured via examples disclosed herein. Any suitable technique for measuring dimensions of the object is applicable to examples disclosed herein. For example, methods and apparatus for dimensioning a box object using image data captured by, for example, the HUD assembly 100 and/or additional image capture devices are disclosed in U.S. Pat. No. 9,741,134, filed Dec. 16, 2013, which is hereby incorporated herein by reference. Additional or alternative methods and apparatus that can be utilized in connection with examples disclosed herein for dimensioning an object include point cloud generators and analyses of point cloud data to measure objects.

Figure 7:
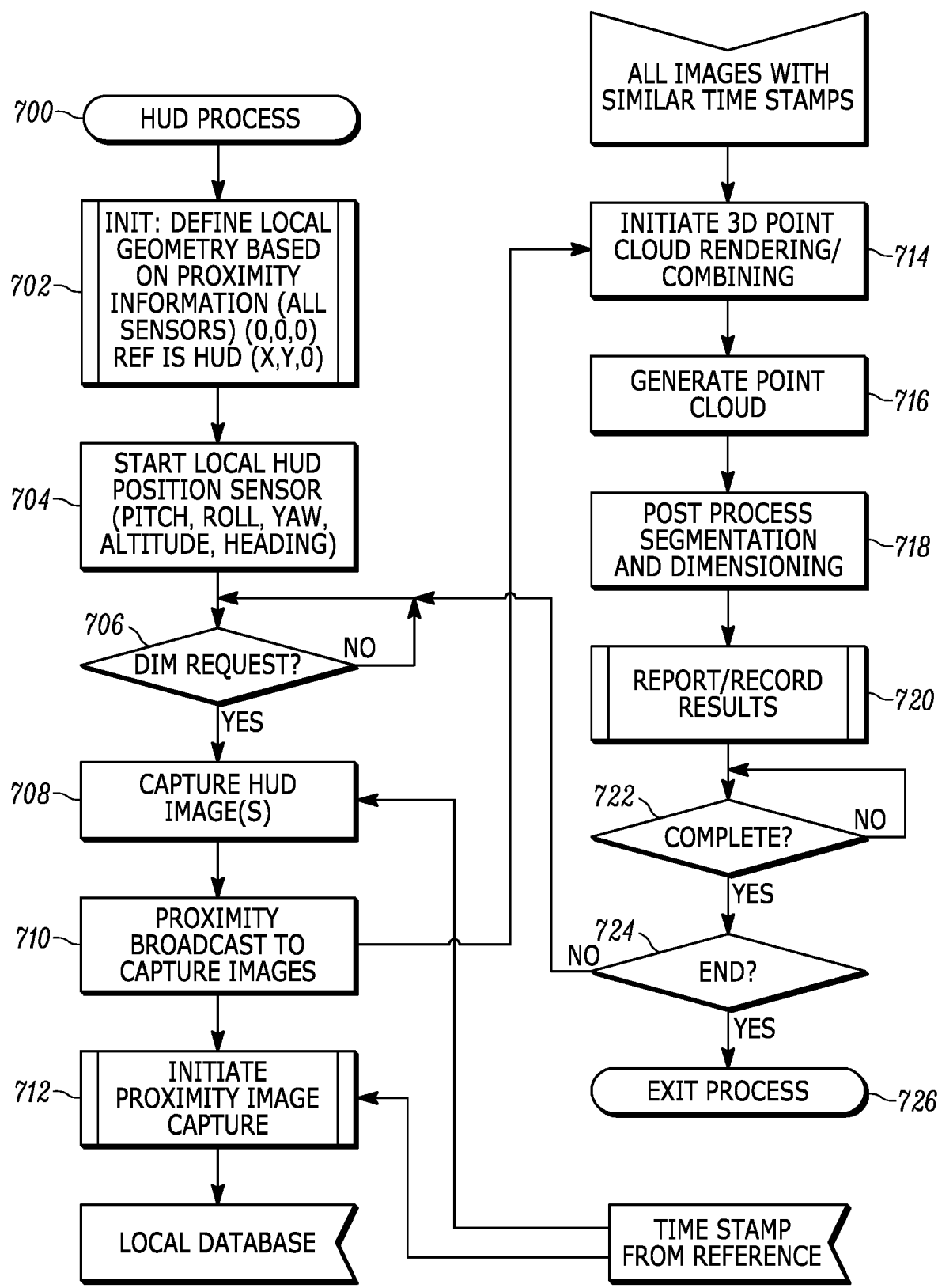
FIG. 7 is flowchart of an example method disclosed herein for enlisting proximate image capture devices for capturing image data representative of an object from multiple perspectives.

FIG. 7 is a flowchart depicting an example method in accordance with teachings of this disclosure. While the example of FIG. 7 is described in connection with the example HUD assembly 100 of FIG. 1, the example of FIG. 7 may be implemented in connection with additional or alternative types of image capture devices, such as handheld mobile computing devices having image capture equipment.

At block 700, the HUD assembly 100 and/or other components of a dimensioning system (e.g., other mobile image capture devices, such as additional HUD assemblies, and/or fixed location image capture devices, such as cameras mounted in a dimensioning zone) are initiating (e.g., powered on). At block 702, the initiation includes defining a local geometry for use in the proximity determinations described herein. For example, a coordinate system can be initialized at a starting point (0,0,0) can be established.

At block 704, the position of the HUD assembly 100 is determined (e.g., via the proximity sensor 127) and is continuously updated as the HUD assembly 100 moves. In the illustrated example, a plurality of position and movement information associated with the HUD assembly 100 is collected such as, for example, pitch, roll, yaw, altitude, and heading information. In some examples, determining the position of the HUD assembly 100 includes calibrating the HUD assembly, e.g., as described by U.S. Pat. No. 9,952,432.

If a dimensioning request is received (block 706) (e.g., triggered by an input from a user, or by a detection by a positioning sensor that an object is currently in a target location or within a target range for dimensioning), the image capture equipment of the HUD assembly 100 captures image data (e.g., two-dimensional and/or three-dimensional data) representative of the field of view of the HUD assembly, which includes an object to be dimensioned (e.g., a box). In the example of FIG. 7, the captured image data is timestamped using a reference clock accessible to other image capture devices in the environment.

At block 710, image capture devices proximate the HUD assembly, as determined by the proximity sensor 127 and/or processing components in communication with the proximity sensor 127 and similar proximity sensors of other image capture devices, are identified.

In one example, a processor, e.g., as part of a real-time location system (RTLS) receives data indicative of the current position of the HUD assembly 100, as well as data indicative of the current position of at least one secondary image capture device. Secondary image capture devices may include, for instance, other mobile image capture devices, such as additional HUD assemblies, and/or fixed location image capture devices, such as cameras mounted in a dimensioning zone. In some examples, the processor receives data indicative of the current positions of many secondary image capture devices. Based on the position data from the HUD assembly 100 and the various secondary image capture devices, the processor calculates the distance between the HUD assembly 100 and each of the secondary image capture devices to determine whether any of the secondary image capture devices are within a proximity distance threshold (e.g., five feet, ten feet, 100 feet, etc.) of the HUD assembly 100.

As an additional or alternative example, the various secondary image capture devices transmit short range wireless signals (e.g., Bluetooth signals) detectable by sensors of the HUD assembly (e.g., proximity sensors). Based on a known range of such a signal, a secondary image capture device is determined to be within a proximity distance threshold of the HUD assembly when the HUD assembly receives the signal. Conversely, a secondary image capture device is determined to be outside of a proximity distance threshold of the HUD assembly when the HUD assembly fails to receive the signal.

Further, the HUD assembly 100 and/or a processing component in communication with the HUD assembly 100 (e.g., a server) sends a request to each of the secondary image capture devices that are identified as proximate the HUD assembly 100. The request indicates that the HUD assembly 100 is dimensioning an object at the location of the HUD assembly 100 and that additional image data for the object at that location is requested. In some examples, the secondary image capture devices are fixed image capture devices aimed at a particular point. In such instances, the image capture devices can image the object when the object is located in the field of view. Alternatively, when the other image capture devices are mobile devices having a dynamic field of view, the image capture devices can determine (e.g., based on their heading, position, pitch, roll, and yaw) when the object is in the field of view, and can image the object when the object is in the dynamic field of view.

At block 712, the proximate secondary image capture device(s) capture image data representative of the object from different perspective(s) than the perspective of the HUD assembly 100. For example, as shown in FIG. 5B, a first HUD assembly faces the object at a first angle, and captures image data from one perspective, while a secondary HUD assembly within proximity of the first HUD assembly (i.e., within a threshold distance) faces the object at a second angle, and captures image data from another perspective. Similarly, as shown in FIG. 5C, a HUD assembly faces the object at a first angle, and captures image data from one perspective, while a mounted camera within proximity of the first HUD assembly faces the object at a second angle, and captures image data from another perspective. The captured image data is timestamped using the same reference as the primary image capture device and is provided to a database.

At block 714, a dimensioning processor (e.g., a server in communication with the HUD assembly 100 or a processor of the HUD assembly 100) receives the image data captured by the HUD assembly 100 and any proximate image capture devices. The dimensioning processor associates image data from the different sources according to common (e.g., within a threshold amount of time) timestamps.

At block 716, the dimensioning processor combines the different instances of image data from the different sources to form a composite representation of the object. In the illustrated example, the dimensioning processor generates a combined point cloud that incorporates the different instances of image data. However, in alternative examples when the image data is not point cloud data, the dimensioning processor combines the image data in alternative manners to form the composite representation of the object.

At block 718, the dimensioning processor segments the point cloud from other data (e.g., background data) and calculates one or more dimensions of the object based on the segmented point cloud. In some examples, the dimensioning processor assigns a confidence score to the one or more dimensions. In some examples, the dimensioning processor communicates the one or more dimensions to the HUD assembly 100 and the results are displayed thereon.

At block 720, the one or more dimensions are reported and/or stored. If the dimensioning process for the object is complete (block 722), control proceeds to block 724. Otherwise, the dimensioning process for the object continues.

At block 724, if the system is powered down, the process is exited (block 726). Otherwise, from block 724, control may return to block 706 to determine whether another dimensioning request has been issued.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

We claim:

1. A computer-implemented method of enlisting proximate image capture devices for capturing image data representative of an object from multiple perspectives, the method comprising:
   capturing, by a first image capture device, first image data representative of an object from a first perspective;
   determining, by a processor, whether a second image capture device is within proximity of the first image capture device; and
   when the second image capture device is within proximity of the first image capture device, sending a request to the second image capture device to cause the second image capture device to capture second image data representative of the object from a second perspective, wherein the first image data and the second image data are combinable to form a composite representation of the object.

2. The computer-implemented method of claim 1, wherein the first image capture device is a heads-up display assembly.

3. The computer-implemented method of claim 1, wherein the first image capture device is a first heads-up display assembly associated with a first user, and the second image capture device is a second heads-up display assembly associated with a second user.

4. The computer-implemented method of claim 1, wherein the first image capture device is a mobile device associated with a first user, and the second image capture device is a stationary device.

5. The computer-implemented method of claim 1, further comprising:
   receiving a user request to capture image data representative of the object; and
   triggering the first image capture device to capture the first image data based on the user request.

6. The computer-implemented method of claim 1, further comprising:
   detecting, by a sensor, that the object is currently in a target location or within a target range for dimensioning; and
   triggering, by the processor, the first image capture device to capture the first image data based on the object being in the target location or the target range.

7. The computer-implemented method of claim 1, wherein determining whether the second image capture device is within proximity of the first image capture device comprises:
   receiving, by a processor, from the first image capture device, data indicative of a position of the first image capture device;
   receiving, by a processor, from the second image capture device, data indicative of a position of the second image capture device;
   calculating, by a processor, based on the position of the first image capture device and the position of the second image capture device, a distance between the first image capture device and the second image capture device; and
   determining, by a processor, whether the calculated distance between the first image capture device and the second image capture device is within a proximity distance threshold.

8. The computer-implemented method of claim 1, wherein determining whether the second image capture device is within proximity of the first image capture device comprises:
   receiving, by a processor, from a fixed RFID reader, an indication that the fixed RFID reader has received an RF blink transmitted by the first image capture device;
   determining, by a processor, based on the indication from the fixed RFID reader, a position of the first image capture device;
   receiving, by a processor, from the fixed RFID reader, an indication that the fixed RFID reader has received an RF blink transmitted by the second image capture device;
   determining, by a processor, based on the indication from the fixed RFID reader, the position of the second image capture device;
   calculating, by a processor, based on the position of the first image capture device and the position of the second image capture device, a distance between the first image capture device and the second image capture device; and
   determining, by a processor, whether the calculated distance between the first image capture device and the second image capture device is within a proximity distance threshold.

9. The computer-implemented method of claim 1, wherein determining whether the second image capture device is within proximity of the first image capture device comprises:
   detecting, by the first image capture device, a short range wireless signal transmitted by the second image capture device; and
   determining, based on the detected short range wireless signal, that the second image capture device is within proximity of the first image capture device.

10. The computer-implemented method of claim 1, further comprising:
    combining the first image data and the second image data to render a three-dimensional point cloud; and
    dimensioning the object using the three-dimensional point cloud.

11. A system for enlisting proximate image capture devices for capturing image data representative of an object from multiple perspectives, the system comprising:
    a plurality of image capture devices;
    memory configured to store computer executable instructions; and
    a processor configured to interface with the plurality of image capture devices and the memory, and configured to execute the computer executable instructions to cause the processor to:
    capture, by a first image capture device, first image data representative of an object from a first perspective;
    determine whether a second image capture device is within proximity of the first image capture device; and
    when the second image capture device is within proximity of the first image capture device, send a request to the second image capture device to cause the second image device to capture second image data representative of the object from a second perspective, wherein the first image data and the second image data are combinable to form a composite representation of the object.

12. The system of claim 11, wherein the first image capture device is a heads-up display assembly.

13. The system of claim 11, wherein the first image capture device is a first heads-up display assembly associated with a first user, and the second image capture device is a second heads-up display assembly associated with a second user.

14. The system of claim 11, wherein the first image capture device is a mobile device, and the second image capture device is stationary.

15. The system of claim 11, wherein the computer executable instructions, when executed, cause the processor to:
   receive a user request to capture image data representative of the object; and
   trigger the first image capture device to capture the first image data based on the user request.

16. The system of claim 11, wherein the processor is configured to interface with a sensor, and wherein the computer executable instructions, when executed, cause the processor to:
   detect, by the sensor, that the object is currently in a target location or within a target range for dimensioning; and
   trigger the first image capture device to capture the first image data based on the object being in the target location or the target range.

17. The system of claim 11, wherein the computer executable instructions, when executed, cause the processor to:
   receive, from the first image capture device, data indicative of a position of the first image capture device;
   receive, from the second image capture device, data indicative of a position of the second image capture device;
   calculate, based on the position of the first image capture device and the position of the second image capture device, a distance between the first image capture device and the second image capture device; and
   determine whether the calculated distance between the first image capture device and the second image capture device is within a proximity distance threshold.

18. The system of claim 11, wherein the computer executable instructions, when executed, cause the processor to:
   receive, from a fixed RFID reader, an indication that the fixed RFID reader has received an RF blink transmitted by the first image capture device;
   determine, based on the indication from the fixed RFID reader, a position of the first image capture device;
   receive, from the fixed RFID reader, an indication that the fixed RFID reader has received an RF blink transmitted by the second image capture device;
   determine, based on the indication from the fixed RFID reader, the position of the second image capture device;
   calculate, based on the position of the first image capture device and the position of the second image capture device, a distance between the first image capture device and the second image capture device; and
   determine whether the calculated distance between the first image capture device and the second image capture device is within a proximity distance threshold.

19. The system of claim 11, wherein the computer executable instructions, when executed, cause the processor to:
   detect, by the first image capture device, a short range wireless signal transmitted by the second image capture device; and
   determine, based on the detected short range wireless signal, that the second image capture device is within proximity of the first image capture device.

20. The system of claim 11, wherein the computer executable instructions, when executed, cause the processor to:
   combine the first image data and the second image data to render a three-dimensional point cloud; and
   dimension the object using the three-dimensional point cloud.

* * * * *